United States Patent [19]

Munro et al.

[11] Patent Number: 5,500,803
[45] Date of Patent: Mar. 19, 1996

[54] MOTION OPTIMIZATION FOR A TAPE STORAGE SYSTEM

[76] Inventors: Frederick Munro, 2315 Ridge Cir., Broomfield, Colo. 80020; Aaron Dailey, 2727 Folsom St., Apt. 317, Boulder, Colo. 80304; Richard Defouw, 805 17th St., Boulder, Colo. 80303; David Trachy, 124 S. Carter Ct., Louisville, Colo. 80027

[21] Appl. No.: 156,493

[22] Filed: Nov. 23, 1993

[51] Int. Cl.⁶ .......................... G06F 17/00; G11B 15/68; B65G 1/00
[52] U.S. Cl. .......................... 364/478; 360/92; 414/273; 414/277
[58] Field of Search ..................... 364/468, 478; 360/91, 92; 414/277, 273

[56] References Cited

U.S. PATENT DOCUMENTS

| | | | |
|---|---|---|---|
| 4,812,629 | 3/1989 | O'Neil et al. | 364/479 |
| 4,864,438 | 9/1989 | Munro | 364/478 |
| 4,864,511 | 9/1989 | Moy et al. | 364/478 |
| 4,928,245 | 5/1990 | Moy et al. | 364/478 |
| 4,932,826 | 6/1990 | Moy et al. | 414/277 |
| 4,945,429 | 7/1990 | Munro et al. | 364/478 |
| 5,121,483 | 6/1992 | Monahan et al. | 395/275 |
| 5,175,690 | 12/1992 | Berthier et al. | 364/478 |
| 5,287,459 | 2/1994 | Gniewek | 395/275 |

*Primary Examiner*—Paul P. Gordon

[57] ABSTRACT

An automated cartridge system optimizes the time it takes to execute a series of cartridge requests. After cartridge requests are received, the library controller calculates the approximate time it will take to execute each possible sequence of pending cartridge requests. The library controller then executes the first request in the sequence of pending requests which will take the shortest elapsed time. This series of calculations and executions continues until all requests are completed. It is another object of the present invention to carry out the motion optimization in such a manner that assures that a particular cartridge request is not put off indefinitely. Each time a hand or arm is allocated to a request, all other requests waiting for these mechanisms have their calculated execution times reduced to increase the likelihood of execution.

28 Claims, 8 Drawing Sheets

MOTION OPTIMIZATION FOR A TAPE STORAGE SYSTEM

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

This invention relates generally to electronic media storage and retrieval, and in particular, to the storage and retrieval of large amounts of data contained within magnetic tape cartridges. More specifically, the invention relates to an improved method and apparatus for motion optimization in the storage and retrieval of magnetic tape cartridges.

2. Description of the Related Art

In recent years, one method of electronic data storage has been the use of four-by-five inch, 200 megabyte tape cartridges. In the past, the storage and retrieval of such cartridges was for the most part carried out by human operators. Such human intervention not only decreased the reliability of tape selection and replacement, but also prolonged the time between when a data request was made and when that data was retrieved by loading a specific cartridge into an available tape drive.

Recent improvements have resulted in systems utilizing tape cartridges that incorporate magazine type automatic loaders which reduce the time that jobs wait for cartridges to be mounted and subsequently read. An example of an automated cartridge system (ACS) is taught by U.S. Pat. Nos. 4,945,429, 4,928,245, 4,932,826 and 4,864,511, all assigned to the Storage Technology Corporation, which are incorporated by reference herein.

FIG. 1 illustrates one such automated cartridge system. The automated cartridge system is made up of at least one library controller 121 (sometimes referred to as a library management unit or (LMU)) and a plurality of library storage modules (LSMs) 111, 112.

Each library controller 121 provides the interface between a host computer 101, 102 and the LSMs 111, 112. The library controller 121 interprets cartridge motion requests from the host computer 101, 102, relaying instructions to the appropriate LSMs 111, 112.

FIGS. 2–4 illustrate the top view and side view of an LSM 111, 112. Each LSM 111, 112 contains a plurality of storage cells 202 to store magnetic tape cartridges and a robot arm assembly 230 for handling the magnetic tape cartridges. The robot arm assembly 230 comprises a plurality of mechanisms all operating in conjunction to provide a movable arm 321 for retrieving tape cartridges from and returning tape cartridges to their individual storage cells 202. The robot arm 321 includes one or more hand assemblies 240 which performs the actual tape retrieval from, or replacement to, the individual storage cells 202.

Tape cartridges retrieved from the individual storage cells 202 are typically loaded onto tape drives 141, 142, 143, 144 so that the data contained on the tape cartridge can be read by the host computer 101, 102. One or more tape drives 141, 142, 143, 144 are attached to each of the LSMs 111,112. The robot arm 321 loads a tape cartridge into the tape drive 141, 142, 143, 144 with the same motion as the replacement of a tape cartridge into one of the individual storage cells 202.

As illustrated in FIG. 5, tape cartridges are entered into and ejected from LSMs 111, 112 through the use of cartridge access ports (CAP) 160.

Tape cartridges may be transferred under robotic control from one LSM 111 to another LSM 112 through devices called "pass-through-ports" (PTPs) 150. Illustrated in FIG. 6, a PTP 150 is comprised generally of a plurality of storage cells 151, 152, 153, 154, called "PTP slots", adapted for rotation by a mechanism 155, called a "PTP mechanism", for transference between LSMs 111, 112. Through use of these PTPs 150, load sharing is accomplished. Tapes may be transported through PTP slots 151, 152, 153, 154 from one LSM 111 where they might be stored to another LSM 112 where there might be unused tape drives 141, 142, 143, 144. Thus, PTPs 150 allow for a more efficient use of available tape drives 141, 142, 143, 144.

In these systems, the task of transferring a cartridge from one location to another is initiated by a cartridge motion request from the host computer 101, 102 to the library controller 121. When the library controller 121 receives the request, it determines the proper path from the cartridge source to the cartridge destination. This path possibly includes source and/or destination storage cells 202, source and/or destination tape drives 141, 142, 143, 144, source and/or destination CAPs 160, and PTP slots 151, 152, 153, 154 for inter-LSM moves. The library controller 121 "allocates" available resources to cartridge motion requests to accomplish cartridge transfers.

The task of actually transferring a cartridge from one location within an LSM 111, 112 to another consists of two operations, a get and a put. In the get operation, the robotic means 230 retrieves the cartridge from a receptacle at a first location. In the put operation, the robotic means 230 moves the cartridge to its destination and inserts it into a receptacle at a second location.

Tape cartridge transfers along a path consist of the following: (1) path allocation; (2) source get; (3) one or more intermediate puts; (4) one or more intermediate gets; (5) destination put; and (6) path deallocation.

Path allocation consists of allocating for the duration of a tape cartridge transfer all PTP slots 151, 152, 153, 154 necessary for inter-LSM moves through the path, the source and/or destination tape drive 141, 142, 143, 144 and the source and/or destination CAPs 160. If the source tape drive 141, 142, 143, 144 or the source and/or destination CAP 160 are unavailable, the cartridge motion request is rejected. If any of the necessary PTP slots 151, 152, 153, 154 or tape drives 141, 142, 143, 144 are unavailable, the cartridge motion request, as described later, waits on a queue until said slot 151, 152, 153, 154 becomes available.

A source get consists of allocating the arm 321 and hand 240 of the robot mechanism 230 within the source LSM 111, 112 to retrieve a tape cartridge from the source location, whether it be a storage cell 202, tape transport 141, 142, 143, 144 or CAP 160. After the tape cartridge has been retrieved, the arm 321 is deallocated and is free to service other requests. However, the hand 240 remains allocated to the present request.

Intermediate puts and gets are repeated for intermediate LSMs 111, 112 along the selected path. An intermediate put always follows either a source get or intermediate get operation and, therefore, will have a hand 240 already allocated to the request. The intermediate put delivers a cartridge to a PTP slot 151, 152, 153, 154 in an LSM 111, 112. The intermediate put consists of a two step process. First, the PTP mechanism 155 in the intermediate LSM 111, 112 is allocated to the request to receive a cartridge and, second, the arm mechanism 321 within the intermediate LSM 111, 112 is allocated to move the cartridge to and insert it into the PTP slot 151, 152, 153, 154 in that LSM 111, 112. The arm 321, hand 240 and PTP mechanism 155 are deallocated upon completion of the intermediate put.

The intermediate get retrieves a cartridge from a PTP slot 151, 152, 153, 154. The intermediate get consists of a three step process. First, a hand 240 in the intermediate LSM 111, 112 is allocated to the request to retrieve the cartridge from a PTP slot 151, 152, 153, 154. Second, the PTP mechanism 155 is allocated to position the PTP slot 151, 152, 153, 154 in the intermediate PTP 150 for transference of the cartridge. Finally, the arm mechanism 321 within the intermediate LSM 111, 112 is allocated to retrieve a cartridge from the PTP slot 151, 152, 153, 154. The arm 321 and PTP mechanism 155 are deallocated upon completion of the intermediate get. The hand 240 remains allocated to the request.

Destination puts are similar to intermediate puts in that they always follow either a source get or intermediate get operation and, therefore, will have a hand 240 already allocated to the request. The destination put consists of allocating an arm mechanism 321 within the destination LSM 111, 112 to move a cartridge to and insert it into the destination storage cell 202, tape drive 141, 142, 143, 144 or CAP 160. Upon completion of the destination put, the arm 321 and hand 240 allocated to the request are deallocated.

When the tape cartridge has reached its destination location, all PTP slots 151, 152, 153, 154 for inter-LSM moves through the path, the source and/or destination tape drives 141, 142, 143, 144 and the source and/or destination CAPs 160 are deallocated.

As described above, the library controller 121 allocates available resources to cartridge motion requests to accomplish cartridge transfers. However, because the library controller 121 may be asked to execute a plurality of cartridge motion requests at any one time, cartridge motion requests compete for available resources. The library controller 121 manages the competition for available resources by allocating the available resources to the cartridge motion requests on a first-come first-served basis. Cartridge motion requests that request resources first are granted them first. A plurality of queues are implemented to handle the allocation of available resources: a PTP slot queue, a PTP mechanism queue, a drive queue, a hand queue and an arm queue.

If the source location and the destination location are in different LSMs 111, 112, the library controller 121 determines if the necessary PTP slots 151, 152, 153, 154 are available. If the necessary PTP slots 151, 152, 153, 154 are available, the PTP slots 151, 152, 153, 154 are allocated to the request and the path for that particular request is granted, i.e., path allocation. Otherwise, the cartridge motion request is queued on the end of the PTP slot queue, implemented in the library controller's 121 computer memory.

When a new cartridge request is received, it is examined to determine if its destination is a tape drive 141, 142, 143, 144 and, if so, if the destination tape drive 141, 142, 143, 144 is available. If the destination tape drive 141, 142, 143, 144 is available, the drive is allocated to the request and processing of the request continues. If the drive is not available, the request is placed in a drive queue. The library controller 121 determines if a tape drive 141, 142, 143, 144 has become available. If a drive becomes available, the library controller 121 scans the drive queue from the oldest entry to the newest entry to determine if any requests in the drive queue need the available tape drive 141, 142, 143, 144. The available tape drive 141, 142, 143, 144 is allocated to the first request in the queue waiting on that tape drive 141, 142, 143, 144.

Each time a PTP slot 151, 152, 153, 154 becomes available, the PTP slot queue is scanned from the oldest entry to the newest entry to determine which cartridge motion requests in the queue are waiting on that PTP slot 151, 152, 153, 154. The first request found for which all necessary PTP slots 151, 152, 153, 154 are available is granted the path and the necessary PTP slots 151, 152, 153, 154 are allocated to it, i.e., path allocation.

Once a path has been allocated to the cartridge motion request, the tape cartridge is transferred along the granted path through a succession of gets (i.e., a source get and a series of intermediate gets) and puts (i.e., a series of intermediate puts and a destination put).

The allocation of available resources to complete a get is as follows. The cartridge motion request is entered into the hand queue, organized from the oldest entry to the newest, to wait until a hand 240 becomes available. When a hand 240 becomes available, the hand queue is scanned from the oldest entry to the newest entry to determine which request in the queue is waiting on the available hand 240. The available hand 240 is allocated to the first request in the hand queue needing that hand 240. If a transfer between LSMs 111, 112 is involved, the cartridge motion request is entered into the PTP mechanism queue, organized from the oldest entry to the newest, to wait until a PTP mechanism 155 becomes available. When a PTP mechanism 155 becomes available, the PTP mechanism queue is scanned from the oldest entry to the newest entry to determine which request in the queue is waiting on the available PTP mechanism 155. The available PTP mechanism 155 is allocated to the first request in the PTP mechanism queue needing that hand 240. The request is then entered into an arm queue to wait until an arm 321 becomes available. When an arm 321 becomes available the arm queue is scanned from the oldest entry to the newest entry to determine which request in the arm queue is waiting on the available arm 321. The available arm 321 is assigned to the first request in the arm queue needing that arm 321. The request is then satisfied by moving the robotic arm 321 so as to move the hand 240 to the location of the receptacle containing the cartridge that is sought and then using the hand 240 to remove the cartridge from that receptacle.

At this point the get is complete. The arm 321 and PTP mechanism 155 are released for reallocation to the next request in the arm queue needing that arm 321 and the next request in the PTP mechanism queue needing that PTP mechanism 155. The hand 240 retains the cartridge it has retrieved and accordingly cannot be released. The request is then returned to the back of the arm queue to wait for an available arm so it that it can complete its transfer through a put operation.

The put operation is essentially the same as that described in the previous paragraph. Upon completion of the get, the request is returned to the arm queue and, if necessary, the PTP mechanism queue, each queue being organized from the oldest entry to the newest, to wait until an arm 321 and PTP mechanism 155 necessary for the put become available. When a PTP mechanism 155 becomes available, the PTP mechanism queue is scanned from the oldest entry to the newest entry to determine which request in the queue is waiting on the available PTP mechanism 155. The available PTP mechanism is allocated to the first request in the PTP mechanism queue needing that hand 240. When an arm 321 becomes available, the arm queue is scanned from the oldest entry to the newest entry to determine which request in the queue is waiting on the available arm 321. The available arm 321 is allocated to the first request in the arm queue needing that arm 321. When an arm 321 is allocated to the request, the arm 321 is moved so as to move the hand 240 and the cartridge contained therein to the receptacle at the destination location. The hand 240 then inserts the cartridge into the receptacle whereupon the put is complete. The PTP mechanism 155, arm mechanism 321 and hand 240 are then released for reallocation to the next request in the PTP mechanism queue, arm queue and hand queue, respectively.

In the operations described above, there exists one resource queue for each resource, i.e., PTP mechanism 155, drive, hand 240 and arm 321, for the entire automatic cartridge system. Each time a resource becomes available, the appropriate queue is scanned from the oldest entry to the newest entry to determine which request in the queue is waiting on the available resource.

In an alternative implementation, there exists one resource queue for each resource for each LSM 111, 112 in the automated cartridge system. Each time a resource become available in an LSM 111, 112, it is allocated to the first element on the queue (in a first-come, first serve implementation, the first entry on the queue will always be the oldest request). This implementation eliminates the need to scan the queue to determine which request in the queue is waiting on the available resource.

As mentioned above, these automated cartridge systems, cartridge requests are performed only on a first-come first-served basis. That is, all cartridge requests are forced to compete for the available resources on an equal footing, and those that request the resources first are granted them first.

In the copending application of Munro et al., entitled "Task Prioritization For a Tape Storage System," filed simultaneously with the present application, the disclosure of which is herein incorporated by reference, the additional feature of task prioritization for use in an automated cartridge system is disclosed. In accordance with this related art, requests to transfer cartridges may be assigned a priority relating to the urgency of the request. The library controller 121 will recognize these assigned priorities and organize the requests so that higher priority requests are executed ahead of lower priority requests. Moreover, the library controller 121 will increase the priorities of lower priority requests as they remain in the queue to assure that they are eventually executed.

While the above described tape storage system operates as described to store and retrieve data, experience has shown that its performance could be improved. Once the cartridge requests have been received, the ACS is unable to determine, given the requests and the state of the arm 321 and hands 240, what sequence of moves (gets or puts) will execute in the shortest amount of time. The ACS is unable to reorder the sequence of motions necessary to service the requests to minimize the time taken to process these requests.

Therefore, there is a need to better utilize LSM 111, 112 resources by minimizing the time taken to execute a series of motions, that is the gets and puts of each request, by reordering the series.

SUMMARY OF THE INVENTION

In accordance with the present invention, there is provided an automated cartridge system which optimizes the time it takes to execute a series of cartridge requests. When cartridge requests are received, the library controller 121 calculates the sequence of all pending cartridge requests which results in the shortest possible execution time. The library controller 121 then executes the first request in that sequence of pending cartridge requests. The library controller 121 continues this routine until all pending cartridge requests have been executed.

To achieve further optimization, the library controller 121 may be restricted to consider only those pending cartridge requests that have a high priority. In this alternative embodiment, the library controller 121 calculates the sequence of priority P pending cartridge requests (i.e. those cartridge requests which have a priority P), such that $PMAX \geq P \geq PMAX-X$ where PMAX is equal to the highest priority request and X is equal to a small positive number, which results in the shortest possible execution time. The library controller then executes the first request in that sequence of priority P pending cartridge requests.

It is another object of the present invention to carry out the motion optimization in such a manner that assures that a particular cartridge request is not put off indefinitely. Each time a hand 240 or arm 321 is allocated to a request, all other requests waiting for these mechanisms have their calculated execution times reduced to increase the likelihood of execution.

BRIEF DESCRIPTION OF THE DRAWINGS

These and other objects, features and advantages of the inventions will be more readily apparent from the following detailed description of the invention in which.

DETAILED DESCRIPTION OF THE INVENTION

In accordance with the invention, motion optimization is added to an ACS. Motion optimization allows the library controller 121 to better utilize LSM 111, 112 resources by minimizing the time taken to execute a series of requests by reordering the series. Motion optimization is achieved by improving the way the library controller 121 allocates the hands 240 and arm 321 of an LSM 111, 112 to execute a plurality of cartridge motion requests.

Figure 1:
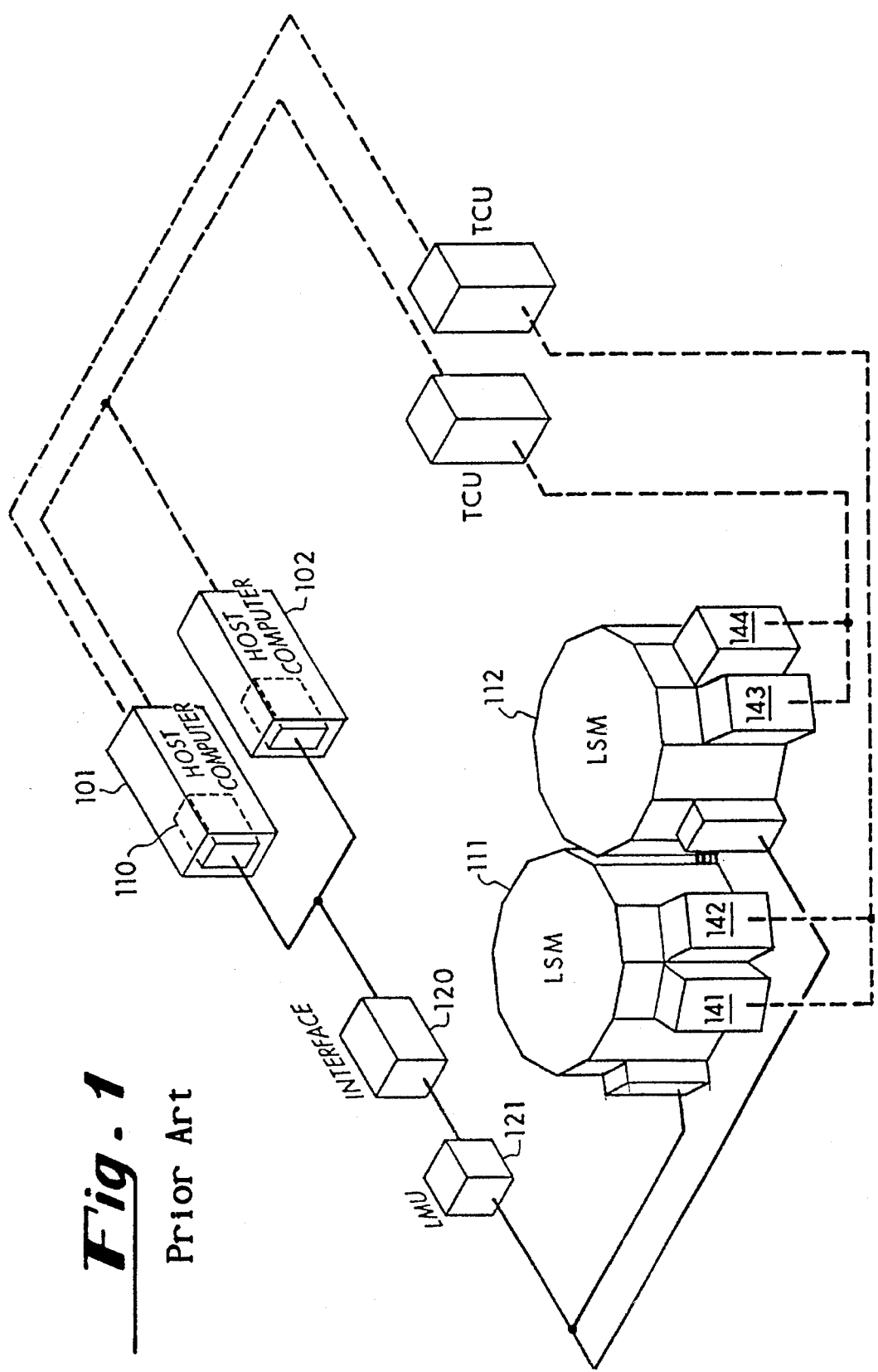
FIG. 1 illustrates the automated magnetic tape cartridge library system in block diagram form.
Figure 2:
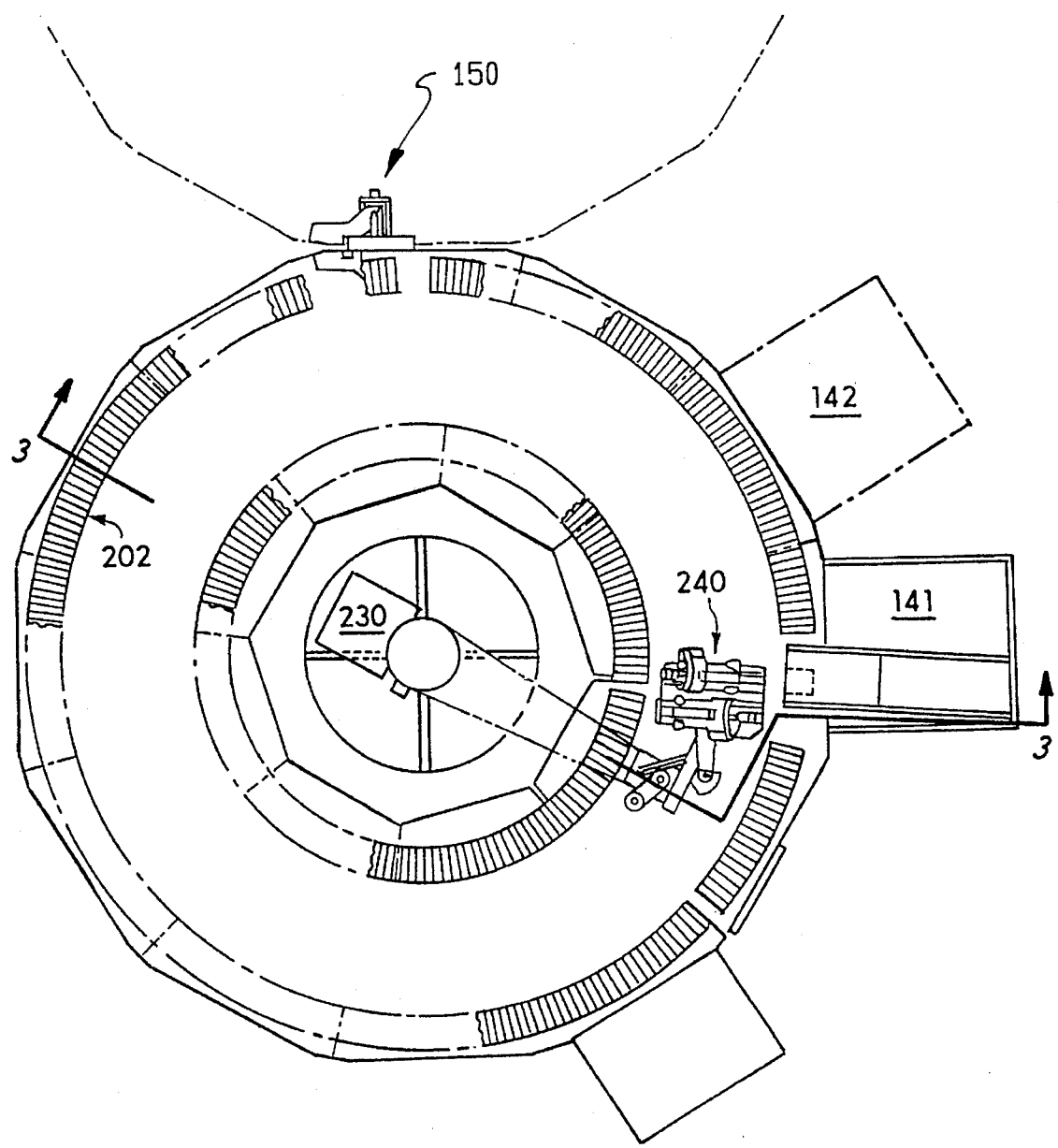
FIG. 2 illustrates a top view of a library module.
Figure 3:
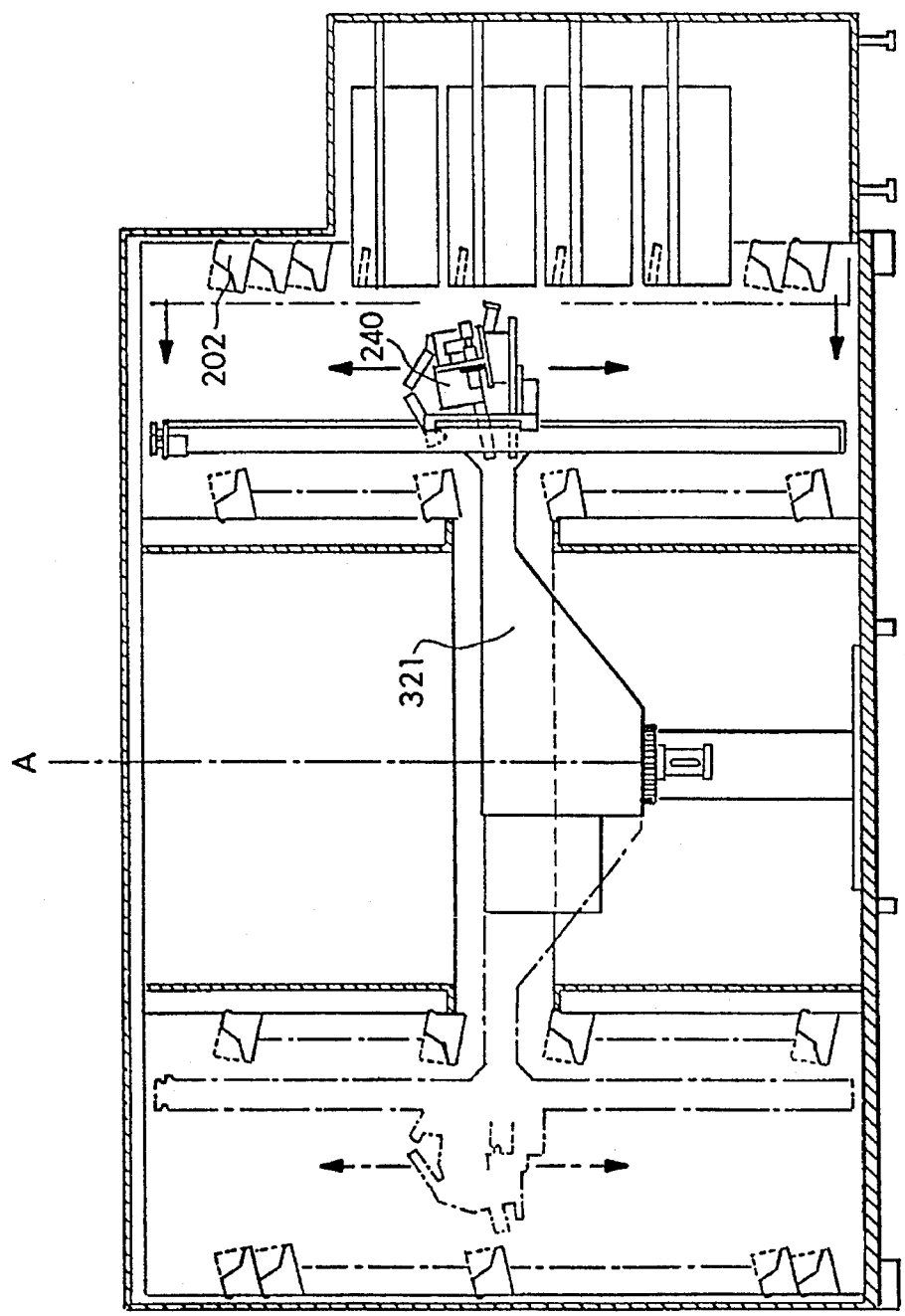
FIG. 3 illustrates a cut away view of a library module with its associated robot arm mechanism and tape cartridge storage cell array.
Figure 4:
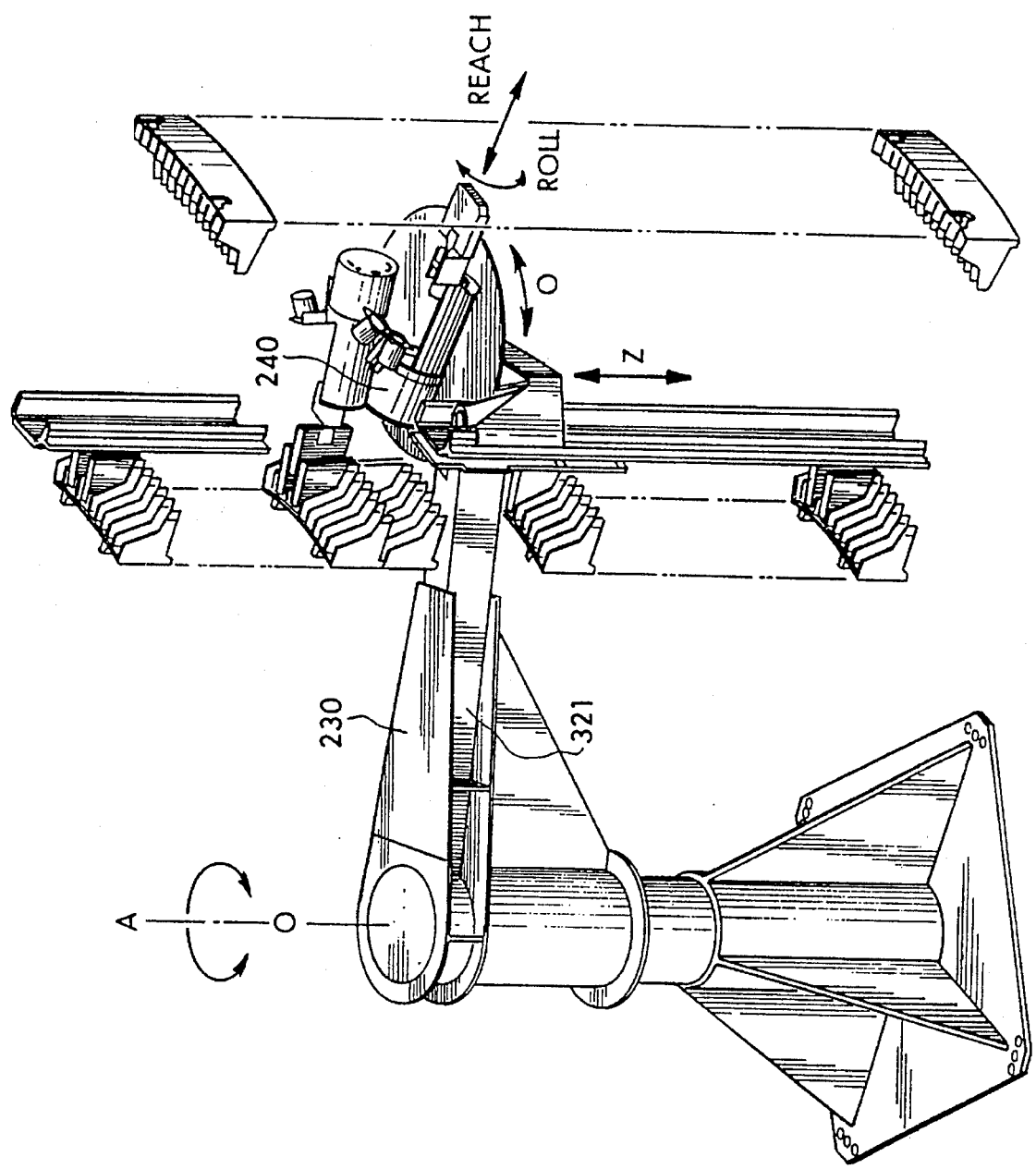
FIG. 4 illustrates a perspective view of the robot arm mechanism.
Figure 5:
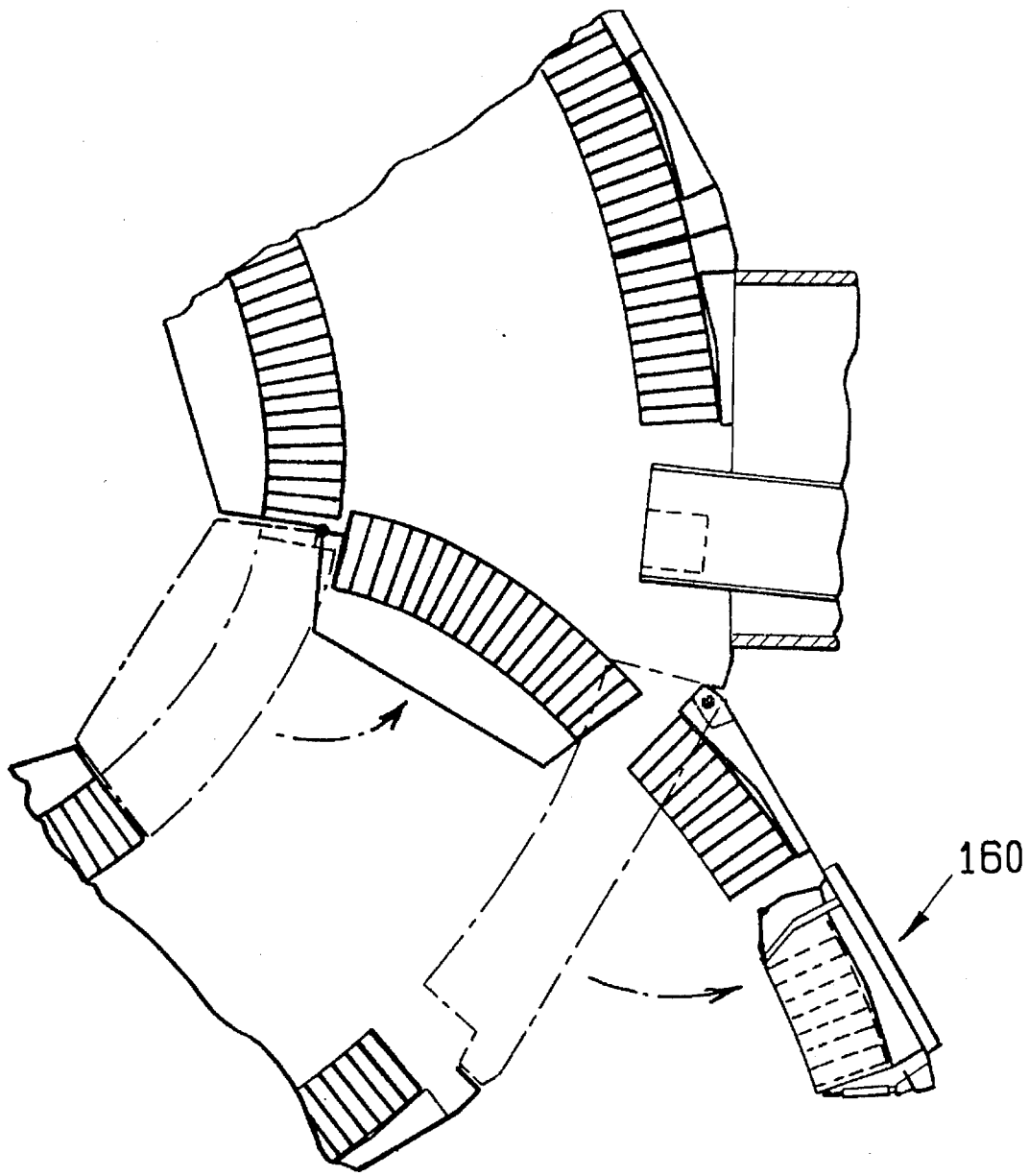
FIG. 5 illustrates in plan view the access doors and cartridge access port shown in FIG. 2.
Figure 6:
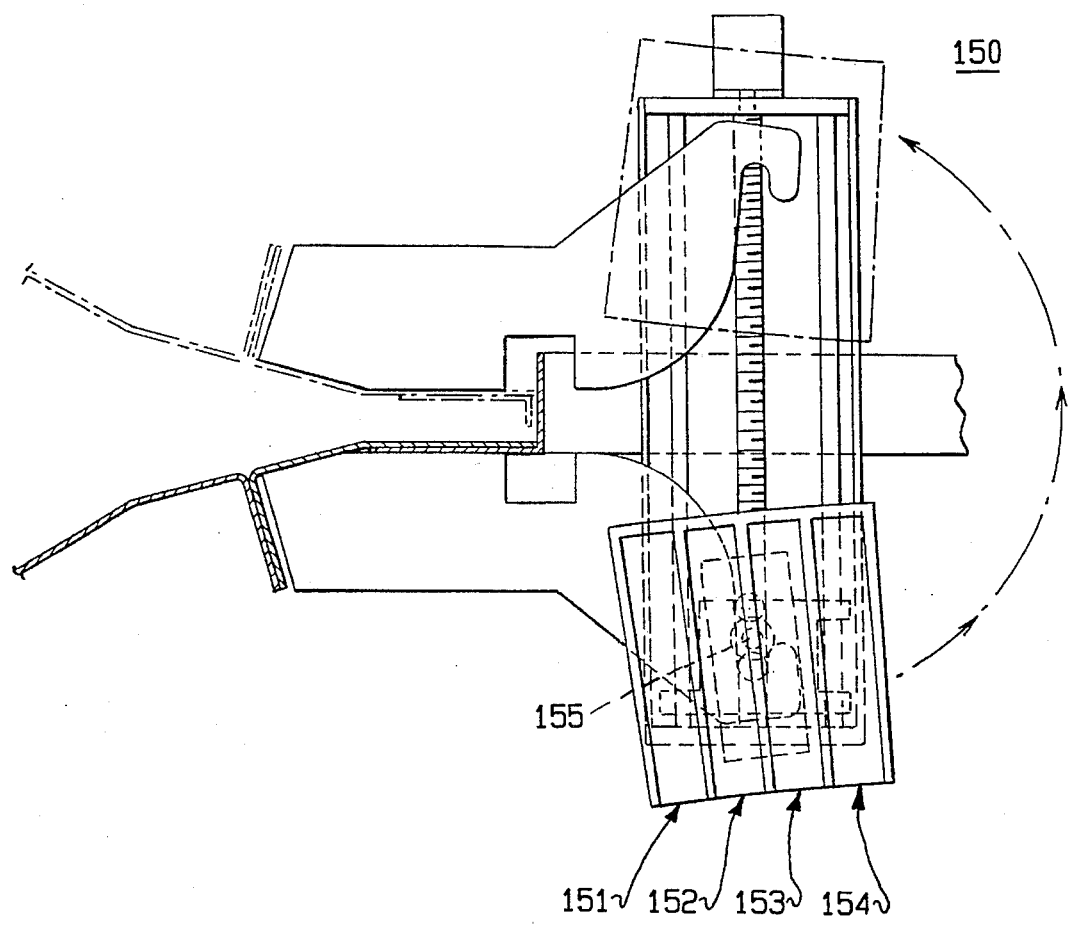
FIG. 6 illustrates in detail the pass through port shown in FIG. 2.
Figure 7A:
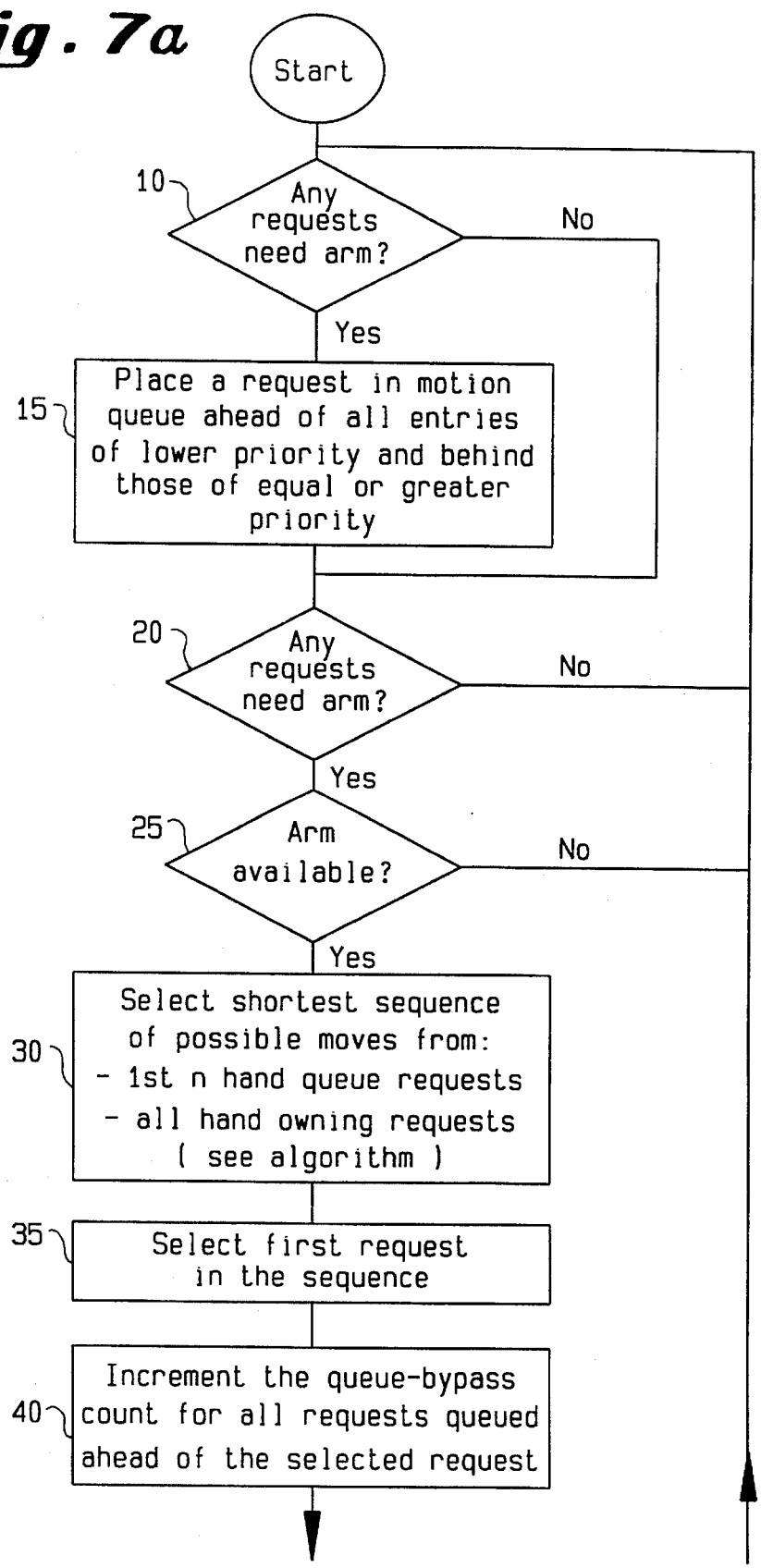
FIGS. 7a and 7b are flowcharts of an embodiment of the invention which provides for motion optimization.
Figure 7B:
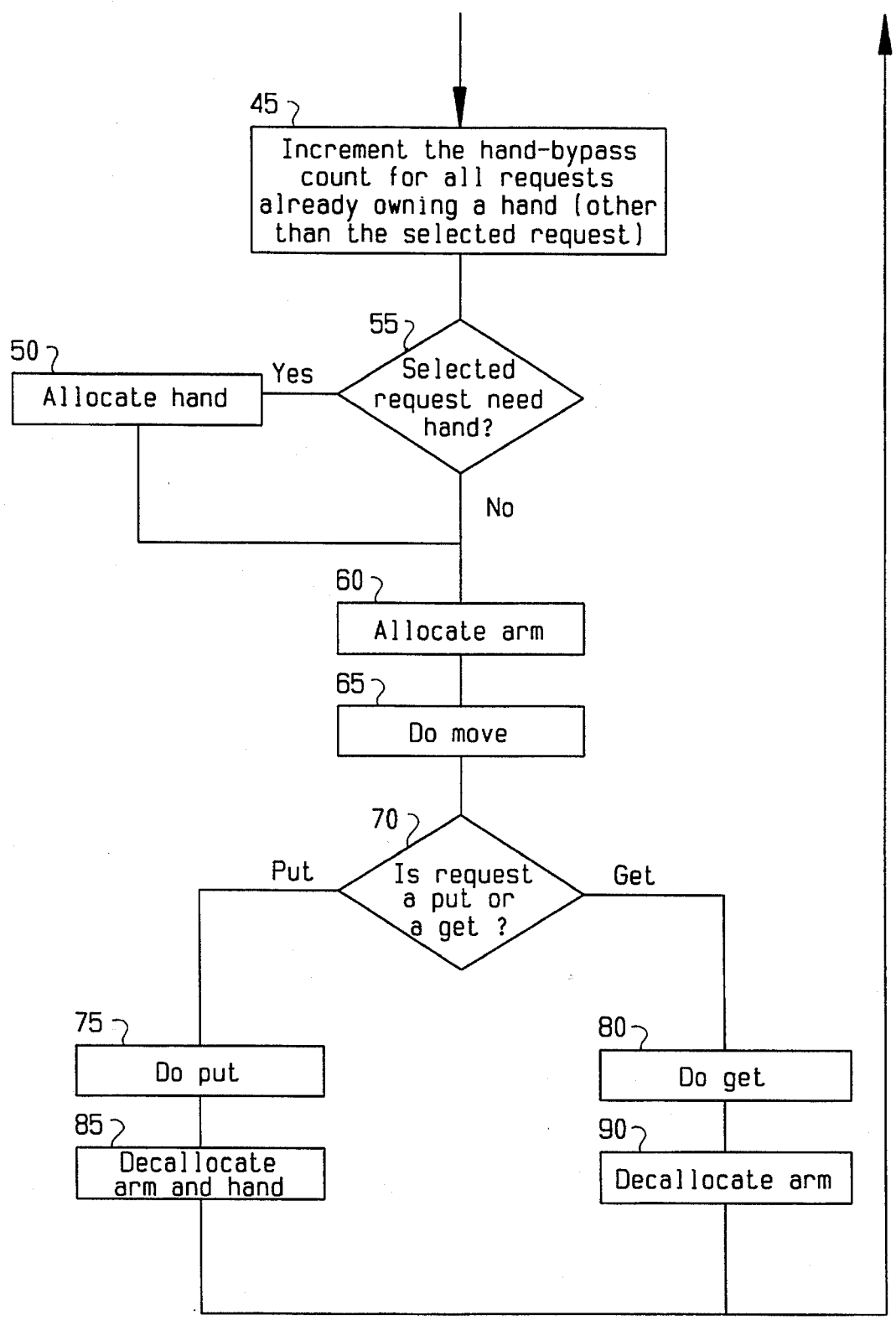

Shown in FIG. 1a is an embodiment of the invention for motion optimization in an automated cartridge system. At step 15 cartridge motion requests received by the library controller 121 are stored in a single queue. Cartridge motion requests received by the library controller 121 are grouped into first and second groups in the queue. The first group of requests consists of those requests which currently are associated with a hand 240 (i.e., those requests which have completed their get operation and are waiting for the arm 321 to become available to perform their put operation). The library controller 121 stores the requests in the first group at the head of the queue. The second group of requests consists of those requests which need both the arm 321 and a hand 240 to proceed (i.e., those requests which have not completed their get operation). The library controller 121 stores these requests at the tail of the queue.

Advantageously, the cartridge motion request are assigned a priority in accordance with Munro et al. In this embodiment of the invention, the library controller 121 stores the requests in the first group at the head of the queue in the order of their assigned priorities. Similarly, the library controller 121 stores the requests at the tail of the queue in accordance with their assigned priorities.

Each time the arm 321 becomes available (step 25), the library controller 121 selects the sequence of executing the requests which is shortest in terms of elapsed time (step 30).

In one embodiment of the invention, the shortest sequence of executing the requests in the queue is selected by the library controller 121 calculating the time it would take to execute all of the requests in the queue for every possible sequence of such requests.

In the preferred embodiment of the invention, the library controller 121 selects the shortest sequence of executing the requests in the queue by means of a recursive procedure. Given a queue of n requests where $n \geq 0$, a current state of the hands 240, and a current state of the arm 321, the procedure functions essentially as follows:

For each request in the queue:

1. If the request is a get, then the request needs a hand to transfer the cartridge. The procedure looks for available hands.
   1.1 If there are hands available
       1.1.1 For all hands available
           1.1.1.1 Allocate the hand to the get
           1.1.1.2 Calculates the time for the get
           1.1.1.3 Recursively calculates the shortest time for the queue of (n−1) requests remaining after the get
           1.1.1.4 If this is the shortest n length sequence found so far, saves this sequence as the selected path
           1.1.1.5 Restores the request queue and hands to their original state
       1.1.2 Next hand available
2. If the request is a put, then the request already owns a hand to transfer the cartridge.
   2.1 Calculates the time for the put
   2.2 Frees up the owned hand for other requests
   2.3 Recursively calculates the shortest time for the queue of (n−1) requests remaining after the put
   2.4 If this is the shortest n length sequence found so far, saves this sequence as the selected path
   2.5 Restores the request queue and hands to their original state In order to reduce the amount of time it takes the library controller 121 to calculate the shortest possible sequence of moves in the request queue, the library controller 121 may be restricted to consider only those requests that have a high priority. By way of example, the library controller 121 may be restricted to consider only priority P pending cartridge requests (i.e., those cartridge motion requests which have a priority P), such that $PMAX \geq P \geq P-X$ where PMAX is equal to the highest priority request and X is equal to a small positive value. Advantageously, these higher priority requests appear at the front of the queue.

Further, the library controller 121 may be restricted to terminate its calculations once it has calculated the shortest possible sequence of n moves, where $n \leq$ the total number of moves required to execute the entire request queue.

Each of the embodiments described above for selecting the shortest sequence of executing the requests in the queue requires the library controller 121 to calculate the elapsed time to execute an individual request. The elapsed time to execute an individual request is determined by the time required to move the arm 321 and hand 240 from their current positions to their desired positions pursuant to the request. The time required to move the arm 321 and hand 240 is a function of the time required to move each mechanism comprising the arm 321 and hand 240 and perform the necessary tasks.

The time required to move an individual mechanism is calculated by: (a) calculating the distance the mechanism must move and (b) calculating the time that a move of that distance takes. For those mechanism moves which occur in parallel, the time required to make the longest move is the total time for executing all the parallel moves. For sequential mechanism moves, the times required to execute the individual members of the sequence are added. In some cases, the distance and, therefore, time is fixed, so a constant value for time is used.

In more complex cases, the distance is calculated by determining the absolute positions of the arm 321 and hand 240 at the beginning and end points and ascertaining the difference. The difference is ascertained either by way of a table look-up or by mathematical calculation. Similarly, the time a move takes to complete is currently calculated by mathematical formulas for each mechanism although this could be sped up by a table look-up scheme.

Once the library controller 121 has selected the shortest sequence of executing the requests in the queue, the library controller 121 executes at step 35 the first request in the sequence.

As described thus far, there is a possibility that certain of the requests in the queue will be put off indefinitely by the need to satisfy higher priority requests for arms 321. Also, certain requests can be put off indefinitely if they are in the wrong place in the LSM 111, 112, i.e., a cartridge on one side of the LSM 111, 112 may never be moved if all other requests are handled on the other side of the LSM 111, 112. In a further embodiment of the present invention, there is included a means of avoiding these problems. In accordance with the invention, associated with each request are two counters, the queue-bypass count and the hand-bypass count.

Each time a hand 240 is allocated to a request, all other requests of higher priority waiting on a hand 240 have their queue-bypass count incremented by determined amount, illustratively by 1 (step 40); for each count, the calculated time to execute the get for this command is reduced by a given amount to increase the likelihood of its execution.

Similarly, each time the arm 321 is allocated, all other requests already owning a hand 240 have their hand-bypass count increased by a determined amount, illustratively by 1 (step 45); for each count, the calculated time to execute the put for this command is reduced by a given amount to increase the likelihood of its execution.

The remainder of FIG. 1b depicts the execution of the motion request. At step 55, the selected request is tested to see if it needs a hand 240. If so, a hand 240 is allocated (step 50). An arm 321 is then allocated (step 60) and the motion request is performed (step 65). If the request is a put (step 70), the put is performed (step 75) and the arm 321 and hand

240 are deallocated (step 85). Otherwise, a get is performed (step S0) and the arm 321 is deallocated (step 90).

A computer program listing one embodiment of an implementation of motion optimization for a tape storage system is attached as an appendix hereto.

Various embodiments of the invention have been described. The descriptions are intended to be illustrative, not limitative. Thus, it will be apparent to those skilled in the art that certain modifications may be made to the invention as described without departing from the scope of the claims set out below. In particular, it should be noted that the prioritization and optimization techniques described in conjunction with the various Figures can be combined with one another and that numerous variations can be made in the details of these techniques.

APPENDIX FOR

MOTION OPTIMIZATION FOR A TAPE STORAGE SYSTEM

PATENT APPLICATION

******************* START OF PROLOGUE ***************************

```
                    StorageTek SECRET
           Property of Storage Technology Corporation
           Do not copy or distribute unpublished work Copyright (1991)
                  Storage Technology Corporation
                       All Rights Reserved
```

FUNCTION NAME: shortest_sequence

FUNCTIONAL DESCRIPTION:
   This function accepts a list of requests, a list of hand states and
   a current arm position. The request list entries indicate:
      - the state of the cartridge motion request ( waiting to do a get,
        waiting to do a put or inactive );
      - the ID of the hand owned by this request (waiting on put only)
      - the location of the cartridge to pick up
      - the destination location for the cartridge in this LSM
   The hand list entry includes:
      - the availablity state of the hand (available for get, or not)
      - the current rotational positon of the hand with respect to the arm
   This function determines the shortest (in terms of time) possible
   of n get or put moves that can be made using these parameters.
   Since this is a recursive function two more arguments are passed to
   this function: the maximum depth of the sequence (n) and the
   current dpth of the sequence. The returned value is the calculated
   time for the shortest sequence found (or 0 is no requests are active).
   Also, the request and hand which are used as the first step of the
   sequence are returned indirectly.

RETURN VALUES:
   DURATION                 the calculated length of time for the shortest
                            sequence of specified length;
   0                        no requests are active or
                            maximum depth has been reached

================================================================================

OPERATIONAL DESCRIPTION:
   This function
     1) returns 0 if the current detpth is greater than the maximum
        depth specifed 2) for each request:
         2.1) if the request is a get
            2.1.1) if there are hands
               2.1.1.1) for all hands
                  2.1.1.1.1) allocates the hand for the get
                  2.1.1.1.2) calculates the time for the get (as reduced by pass
                             for queue_bypass count)

2.1.1.1.3) calculates the shortest time for the (n-1)
                             length sequence after the get
                  2.1.1.1.4) if this is the shortest n length sequence
                             found so far, keep this as the selected path
                  2.1.1.1.5) return request and hand lists to original state
               2.1.1.2) next hand

```
*        2.1) if the request is a put (already owns a hand)
*            2.1.1) calculates the time for the put (as reduced for hand_bypass
*                       count)
*            2.1.2) free up the owned hand for other requests
*            2.1.3) calculates the shortest time for the (n-1)
*                       length sequence after the put
*            2.1.4) if this is the shortest n length sequence
*                       found so far, keep this as the selected path
*            2.1.5) return request and hand lists to original state
*
*        2.2) if request is inactive do nothing
*
*    3) next request
*
*    4) If no requests were active return a time of 0
*    5) set the indirect values for request and hand which were
*           used in the first step of the shortest sequence
*    6) return the duration of the shortest sequence found
*
*
************************ END OF PROLOGUE *****************************/ enum typedef
    {
    DONE,                   /* request is not active                    */
    GET,                    /* request is waiting to do its get cartridge*/
    PUT                     /* request is waiting to do its put cartridge*/
    } REQUEST_STATE;

struct Hand_state
    {
    BOOLEAN         hand_available;   /* hand is available (empty) for get  */
    HAND_POSITION   hand_position;    /* hand position in reference to the  */
                                      /*                      arm position  */
    };

struct Request
    {
    REQUEST_STATE   request_state;    /* state of request (DONE, GET or PUT)  */
    int             request_hand;     /* hand owned by request (PUT phase only) */
    POSITION        start_position;   /* place to pick up cartridge           */
    POSITION        end_position;     /* place to put down cartridge          */
    int             queue_bypass;     /* times bypassesd for hand alloc (get) */
    int             hand_bypass;      /* times bypassesd for arm alloc (put)  */
    };

DURATION shortest_sequence(
    int                 current_depth,   /* current recursion depth
    int                 max_depth,       /* maximum recursion depth desired
    struct  Request     requests[],      /* state of requests to start sequence
    struct  Hand_states hand_states[],   /* state of hands to start sequence
    POSITION            arm_position,    /* arm position at sequence start
    int                 *first_request_in_sequence, /* indirect return value: first
                                          /* request in shortest sequence
```

```
int            *first_hand_in_sequence )    /* indirect return value: first
                                             /* hand in shortest sequence
{
DURATION       shortest_time;               /* total time of shorest sequence found
DURATION       sequence_time;               /* time for sequence under consideration
int            hand_id;                     /* hand identifier variable
int            request_id;                  /* request identifier variable
BOOLEAN        any_request_active;          /* flag which indicates if any requests
                                            /* are active (GET or PUT) at this level
HAND_POSITION  old_hand_position;            /* temporary holder for hand position /*--------------------------------------------------------------------------
 *   initialize flags and return values (both direct and indirect)
 *--------------------------------------------------------------------------
any_request_active = FALSE;
shortest_time = MAXTIME;
*first_request_in_sequence = -1;
*first_hand_in_sequence = -1;

/*--------------------------------------------------------------------------
 *   if the maximum depth has been exceeded, the returned sub-sequence takes 0
 *--------------------------------------------------------------------------
if ( current_depth > max_depth )
    {
    return( 0 );
    }

/*--------------------------------------------------------------------------
 *   loop through all requests to find shortest sub-sequence
 *--------------------------------------------------------------------------
for( request_id = 0; request_id < MAXREQ; ++request_id )
    {
    switch( requests[ request_id ].request_state )
        {
        case GET:
            any_request_active = TRUE;
            /*--------------------------------------------------------------
             *   this request is in it's get phase (it needs a hand - try them all
             *--------------------------------------------------------------
            for ( hand_id = 0; hand_id < MAXHAND; ++hand_id )
                {
                /*----------------------------------------------------------
                 *   if the hand is in use, skip it
                 *----------------------------------------------------------
                if ( hand_states[ hand_id ].hand_available == FALSE )
                    {
                    continue;
                    }

/*----------------------------------------------------------
                 *   this hand is available - temporarily allocate it to the request
                 *----------------------------------------------------------
                hand_states[ hand_id ].hand_available = FALSE;
                requests[ request_id ].request_hand = hand_id;
                old_hand_position = hand_states[ hand_id ].hand_position;

/*----------------------------------------------------------
                 *   time the move for this get and place the request in PUT phase
                 *   NOTE: actual time is reduced by a a descrete amount for
```

```
*            each queue_bypass count)
*-------------------------------------------------------------------
sequence_time = calculate_move_time( arm_position,
                                &hand_states[ hand_id ].hand_position
                                requests[ request_id ].hand_bypass
                                requests[ requext_id ].start_position
                                GET );

requests[ request_id ].request_state = PUT;

/*-------------------------------------------------------------------
*  now calculate the shortest sequence after this move
*-------------------------------------------------------------------
sequence_time += shortest_sequence( current_depth + 1,
                                max_depth,
                                requests,
                                hand_states,
                                requests[ request_id ].start_position /*-------------------------------------------------------------------
*  if the sequence is the shortest yet found, then store the total
*  time  and the request ID and hand ID of the first move
*-------------------------------------------------------------------
if ( sequence_time < shortest_time )
   {
   shortest_time = sequence_time;
   *first_request_in_sequence = request_id;
   *first_hand_in_sequence = hand_id;
   }

/*-------------------------------------------------------------------
*  restore the request and hand states to their original values
*-------------------------------------------------------------------
requests[ request_id ].request_state = GET;
hand_states[ hand_id ].hand_available = TRUE;
hand_states[ hand_id ].hand_position = old_hand_position;
   }

/*-------------------------------------------------------------------
*  we have calculated the shortest sequence starting with this reque
*-------------------------------------------------------------------
break;

case PUT:
   any_request_active = TRUE;
   /*-------------------------------------------------------------------
   * this request has a hand already
   *-------------------------------------------------------------------
   hand_id = request[ request_id ].request_hand;
   requests[ request_id ].request_hand = hand_id;
   old_hand_position = hand_states[ hand_id ].hand_position;

/*-------------------------------------------------------------------
   *  time the move for this put and place the request in DONE phase
   *  NOTE: actual time is reduced by a a descrete amount for
   *           each hand_bypass count)
   *-------------------------------------------------------------------
   sequence_time = calculate_move_time( arm_position,
                                   &hand_states[ hand_id ].hand_position
```

```
                              requests[
                            ^ requests, request_id ].end_position,
                              requests[ request_id ].hand_bypass,
                              PUT );

requests[ request_id ].request_state = DONE;
    hand_states[ hand_id ].hand_available = TRUE;

/*------------------------------------------------------------
     * now calculate the shortest sequence after this move
     *------------------------------------------------------------
    sequence_time += shortest_sequence( current_depth + 1,
                                        max_depth,
                                        requests,
                                        hand_states,
                                        requests[ requext_id ].end_position /*------------------------------------------------------------
     * if the sequence is the shortest yet found, then store the total time
     * and the request ID and hand ID of the first move
     *------------------------------------------------------------
    if ( sequence_time < shortest_time )
        {
        shortest_time = sequence_time;
        *first_request_in_sequence = request_id;
        *first_hand_in_sequence = hand_id;
        }

/*------------------------------------------------------------
     * restore the request and hand states to their original values
     *------------------------------------------------------------
    requests[ request_id ].request_state = PUT;
    hand_states[ hand_id ].hand_available = FALSE;
    hand_states[ hand_id ].hand_position = old_hand_position;

/*------------------------------------------------------------
     * we have calculated the shortest sequence starting with this reque
     *------------------------------------------------------------
    break;

case DONE:
    /*------------------------------------------------------------
     * this request is not active, we can skip it
     *------------------------------------------------------------
    break;

}   /* end of request_state switch */

/*------------------------------------------------------------
 * if no requests are active then there is nothing to do - 0 time
 *------------------------------------------------------------*/
if ( any_request_active == FALSE )
    {
    return( 0 );
    }

/*------------------------------------------------------------
 * return the shortest time we found for any sequence
 *------------------------------------------------------------*/
```

```
    return( shortest_time );
}
```

```
*           DESCRIPTION:
* OPERATIONAL DESCRIPTION:
*   This function
*       1) returns 0 if the current detpth is greater than the maximum
*          depth specifed
*
*       2) for each request:
*           2.1) if the request is a get
*               2.1.1) if there are hands
*                   2.1.1.1) for all hands
*                       2.1.1.1.1) allocates the hand for the get
*                       2.1.1.1.2) calculates the time for the get (as reduced
*                                  for queue_bypass count)
*
*                       2.1.1.1.3) calculates the shortest time for the (n-1)
*                                  length sequence after the get
*                       2.1.1.1.4) if this is the shortest n length sequence
*                                  found so far, keep this as the selected_path
*                       2.1.1.1.5) return request and hand lists to original state
*                   2.1.1.2) next hand
*           2.1) if the request is a put (already ownas a hand)
*               2.1.1) calculates the time for the put (as reduced for hand_bypass
*                      count)
*               2.1.2) free up the owned hand for other requests
*               2.1.3) calculates the shortest time for the (n-1)
*                      length sequence after the put
*               2.1.4) if this is the shortest n length sequence
*                      found so far, keep this as the selected path
*               2.1.5) return request and hand lists to original state
*
*           2.2) if request is inactive do nothing
*
*       3) next request
*
*       4) If no requests were active return a time of 0
*       5) set the indirect values for request and hand which were
*          used in the first step of the shortest sequence
*       6) return the duration of the shortest sequence found
*
*
************************* END OF PROLOGUE ************************** enum typedef
{
    DONE,                       /* request is not active                    */
    GET,                        /* request is waiting to do its get cartridge*/
    PUT                         /* request is waiting to do its put cartridge*/
} REQUEST_STATE;

struct Hand_state
{
    BOOLEAN         hand_available;     /* hand is available (empty) for get  */
    HAND_POSITION   hand_position;      /* hand position in reference to the  */
                                        /*                    arm position    */
};

struct Request
{
    REQUEST_STATE   request_state;      /* state of request (DONE, GET or PUT)  */
    int             request_hand;       /* hand owned by request (PUT phase only) */
    POSITION        start_position;     /* place to pick up cartridge            */
    POSITION        end_position;       /* place to put down cartridge           */
    int             queue_bypass;       /* times bypassesd for hand alloc (get)
}
```

```
/*------------------------------------------------------------------------
 *
 * This function calculates the time to move the robot arm/hand assembly
 * from its current position to the desired position.
 *
 * It does this by calculating the time it takes for each mechanism
 * (currently: theta, Z, wrist, roll, reach) to get to their desired
 * position from their current position.  For those moves which are concurrent
 * the maximum of the individual moves is the total time for all moves.  For
 * sequential moves, the members of the sequence are added.
 *
 * The time for an individual mechanism move is calculated by:
 *    a) calculating the distance the mechanism must move and
 *    b) calculating the time that a move of that diatance takes
 * In some case the distance (and therefore time) is fixed, so a
 * constant value is used.
 *
 * In more complex case the distance is calculated by determining the
 * absolute positions of the beginning and end points and finding the
 * difference.  This is done table look up, although an mathematical
 * calculation would also work.
 *
 * Similarly, the time a move takes to complete is currently calculated
 * by mathematical formulas for each mechanism, although this could
 * be sped up by a table look up scheme.  (The trade off is that
 * tables are usuallfy fast to access but low on accuracy, while
 * formulas can provide better accuracy but use more time.)
 *
 *------------------------------------------------------------------------*/ calculate_move_time(
    POSITION       arm_position,         /* current theta, Z position of arm  */
    HAND_POSITION  hand_position,        /* postion of selected hand          */
    POSITION       end_position,         /* postion to which to move the hand */
    INT            hand_bypass_factor,   /* offset factor for aging           */
    REQUEST_STATE  get_put_flag )        /* get or put flag                   */
{

/* calculate time to do the theta move                                    */ theta_move_distance = compute_theta_distance( arm_position.theta,
                                                  end_position.theta );

theta_time = theta_time_from_distance( theta_move_distance );

/* calculate time to do the z move                                        */ z_move_distance = compute_z_distance( arm_position.z,
                                          end_position.z );

z_time = z_time_from_distance( z_move_distance );

/* calculate time move wrist from beginning to end wall                   */ if ( <hand and end postion require wrist rotation> )
        {
        wrist_time = WRIST_CONSTANT;
        }
    else
```

```
    {
    wrist_time = 0;
    }
/* calculate time to align hand to cell orientation             */ if ( <hand position requires horizontal/vertical roll> )
    {
    roll_time = ROLL_CONSTANT;
    }
else
    {
    roll_time = 0;
    }

/* calculate total time of concurrent moves                     */
concurrent_time =  maximum( theta_time, z_time, wrist_time, roll_time );

/* calculate reach time                                         */ if ( get_put_flag == GET )
    {
    reach_time = GET_CONSTANT;
    }
else
    {
    reach_time = PUT_CONSTANT
    } return( concurrent_time + reach_time );
}
```

We claim:

1. An apparatus for transferring objects between locations in a multi-dimensional storage array in response to n pending requests to transfer objects, where n≧2, comprising:
   a robot for transferring said objects between locations in said storage array; and
   a library controller having:
      means for controlling said robot in response to the pending requests to transfer objects; and
      means for determining the shortest possible time to execute m pending requests, where 2≦m≦n, by considering the time to execute differently ordered sequences of the m pending requests.

2. The apparatus of claim 1, wherein the determining means includes:
   means for ordering different sequences for executing m requests to transfer objects between locations;
   means for computing the time to execute different sequences of m requests; and
   means for selecting for execution a first request in the sequence of m requests having the shortest execution time.

3. The apparatus of claim 1 further comprising means for moving said robot to execute the requests.

4. The apparatus of claim 1, wherein the determining means includes:
   means for determining different sequences for executing m requests to transfer objects between locations;
   means for computing the time to execute different sequences of m requests to transfer objects between locations; and
   means for selecting for execution a first request in the sequence of m requests to transfer having the shortest execution time.

5. The apparatus of claim 1, wherein the determining means includes means for calculating the time to execute a request to transfer an object.

6. The apparatus of claim 5, the determining means further including means for reducing the calculated time to execute a request to transfer an object to increase the likelihood of its execution.

7. The apparatus of claim 1, wherein the determining means includes means for executing a procedure for selecting the shortest possible time to execute m requests to transfer objects.

8. A method of transferring objects between locations in a multi-dimensional storage array with robotic means comprising the steps of:
   controlling said robot means in response to n pending requests to transfer objects between locations in the array, where n≧2; and
   determining the shortest possible time to execute m pending requests, where 2≦m≦n, by considering the time to execute differently ordered sequences of the m pending requests.

9. The method of claim 8 wherein the requests are assigned a priority and the m pending requests are those requests having a priority greater than or equal a predetermined threshold priority.

10. The method of claim 8, further comprising the step of moving said robotic means to execute the requests.

11. The method of claim 8, the step of determining the shortest possible time comprising the steps of:
   determining different sequences for executing m requests to transfer objects between locations;
   computing the time to execute different sequences of m requests to transfer objects between locations; and
   selecting for execution a first request in the sequence of m requests having the shortest execution time.

12. The method of claim 8, the step of determining the shortest possible time comprising the step of calculating the time to execute a request to transfer an object.

13. The method of claim 12, the step of determining the shortest possible time further comprising the step of reducing the calculated time to execute a request to transfer an object to increase the likelihood of its execution.

14. The method of claim 8, the step of determining the shortest possible time comprising the step of executing a procedure for selecting the shortest possible time to execute m requests to transfer objects.

15. An apparatus for transferring objects between locations in a multi-dimensional storage array in response to n pending requests to transfer objects, where n≧2, comprising:
   a robot for transferring said objects between locations in said storage array; and
   a library controller having:
      means for controlling said robot in response to the pending requests to transfer objects; and
      means for determining a shortest sequence to execute m pending requests, where 2≦m≦n by considering differently ordered sequences of pending requests.

16. The apparatus of claim 15, wherein the requests are assigned a priority and the m requests are those requests having a priority greater than or equal to a predetermined threshold priority.

17. The apparatus of claim 15 further comprising means for moving said robot to execute the first request in the shortest sequence.

18. The apparatus of claim 15, wherein the determining means includes:
   means for ordering different sequences of m requests;
   means for computing the time to execute the different sequences of m requests; and
   means for selecting for execution a first request in the shortest sequence.

19. The apparatus of claim 15, wherein the determining means includes means for calculating the time to execute a request to transfer an object.

20. The apparatus of claim 19, the determining means further including means for reducing the calculated time to execute a request to transfer an object to increase the likelihood of its execution.

21. The apparatus of claim 15, wherein the determining means includes means for executing a procedure for selecting the shortest sequence to execute m requests to transfer objects, the procedure comprising the steps of:
   calculating the time to execute a first request to transfer an object; and
   recursively calling the procedure for selecting the shortest sequence where the procedure is passed the requests less the first request.

22. A method of transferring objects between locations in a multi-dimensional storage array with robotic means comprising the steps of:
   controlling said robot means in response to n pending requests to transfer objects between locations in the array, where n≧2; and
   determining a shortest sequence to execute m pending requests, where 2≦m≦n by considering differently ordered sequences of pending requests.

23. The method of claim 22 wherein the requests are assigned a priority and the m pending requests are only those requests having a priority greater than or equal to a predetermined threshold priority.

24. The method of claim 22, further comprising the step of moving said robotic means to execute the first request in the shortest sequence.

25. The method of claim 22, the step of determining the shortest sequence comprising the steps of:

ordering different sequences of m requests;

computing the time to execute the different sequences of m requests; and selecting for execution a first request in the shortest sequence.

26. The method of claim 22, the step of determining the shortest sequence comprising the step of calculating the time to execute a request to transfer an object.

27. The method of claim 26, the step of determining the shortest sequence further comprising the step of reducing the calculated time to execute a request to transfer an object to increase the likelihood of its execution.

28. The method of claim 22, the step of determining the shortest sequence comprising the step of executing a procedure for selecting the shortest sequence to execute m requests to transfer objects, the procedure comprising the steps of:

calculating the time to execute a first request to transfer an object; and recursively calling the procedure for selecting the shortest sequence where the procedure is passed the requests less the first request.

* * * * *